(12) United States Patent
Masson et al.

(10) Patent No.: US 12,540,553 B2
(45) Date of Patent: Feb. 3, 2026

(54) METHOD FOR MANUFACTURING A VANE MADE OF A COMPOSITE MATERIAL WITH INTEGRATED ATTACHMENT LUGS AND PLATFORMS

(71) Applicant: SAFRAN AIRCRAFT ENGINES, Paris (FR)

(72) Inventors: Antoine Hubert Marie Jean Masson, Moissy-Cramayel (FR); Célia Iglesias Cano, Moissy-Cramayel (FR); Larry Sylvio Laborieux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/254,972

(22) PCT Filed: Nov. 22, 2021

(86) PCT No.: PCT/FR2021/052066
§ 371 (c)(1),
(2) Date: May 30, 2023

(87) PCT Pub. No.: WO2022/117931
PCT Pub. Date: Jun. 9, 2022

(65) Prior Publication Data
US 2024/0093612 A1    Mar. 21, 2024

(30) Foreign Application Priority Data

Dec. 1, 2020 (FR) ...................... 2012480

(51) Int. Cl.
*F01D 5/28* (2006.01)
(52) U.S. Cl.
CPC .......... *F01D 5/282* (2013.01); *F05D 2230/50* (2013.01); *F05D 2300/603* (2013.01)

(58) Field of Classification Search
None
See application file for complete search history.

(56) References Cited

U.S. PATENT DOCUMENTS

| 5,246,756 A | 9/1993 | All et al. |
| 5,965,266 A | 10/1999 | Goujard et al. |

(Continued)

FOREIGN PATENT DOCUMENTS

| EP | 2 154 119 A1 | 2/2010 |
| EP | 3 186 486 A1 | 7/2017 |

(Continued)

OTHER PUBLICATIONS

International Search Report as issued in International Patent Application No. PCT/FR2021/052066, dated Feb. 25, 2022.

*Primary Examiner* — Kayla Mccaffrey
(74) *Attorney, Agent, or Firm* — Pillsbury Winthrop Shaw Pittman LLP

(57) ABSTRACT

A method for manufacturing a turbomachine vane made of composite material, the method including forming, by three-dimensional or multilayer weaving, a fiber blank separated across its thickness into first, second and third parts in two non-interlinked areas present at the longitudinal ends of the fiber blank, the first part located between the second and third parts to which it is connected by weaving outside non-interlinked areas, forming, from the fiber blank, a preform of the vane to be produced, by unfolding and shaping, at each longitudinal end and on either side of the first part, the segments of the second part and the segments of the third part not interlinked with the first part to form preform parts for a platform of the vane, the segments of the first part not interlinked with the segments of the second and third parts extending along the longitudinal axis, and densifying the preform.

8 Claims, 13 Drawing Sheets

(56) References Cited

U.S. PATENT DOCUMENTS

| | | | | |
|---|---|---|---|---|
| 9,427,834 B2* | 8/2016 | Fremont | ................. | B29B 11/16 |
| 10,267,164 B2* | 4/2019 | Berdou | ................ | D03D 25/005 |
| 10,280,537 B2* | 5/2019 | Marchal | ................. | B29C 70/24 |
| 10,519,576 B2* | 12/2019 | Marchal | ................... | D03D 1/00 |
| 10,532,521 B2* | 1/2020 | Lanfant | ................. | C04B 35/563 |
| 10,781,708 B2* | 9/2020 | Gimat | ..................... | F01D 5/282 |
| 2018/0319101 A1* | 11/2018 | Lanfant | ................... | B29C 70/24 |

FOREIGN PATENT DOCUMENTS

| WO | WO 2013/079860 A1 | 6/2013 |
|---|---|---|
| WO | WO 2016/030608 A1 | 3/2016 |
| WO | WO 2016/174345 A1 | 11/2016 |

* cited by examiner

[Fig. 1]
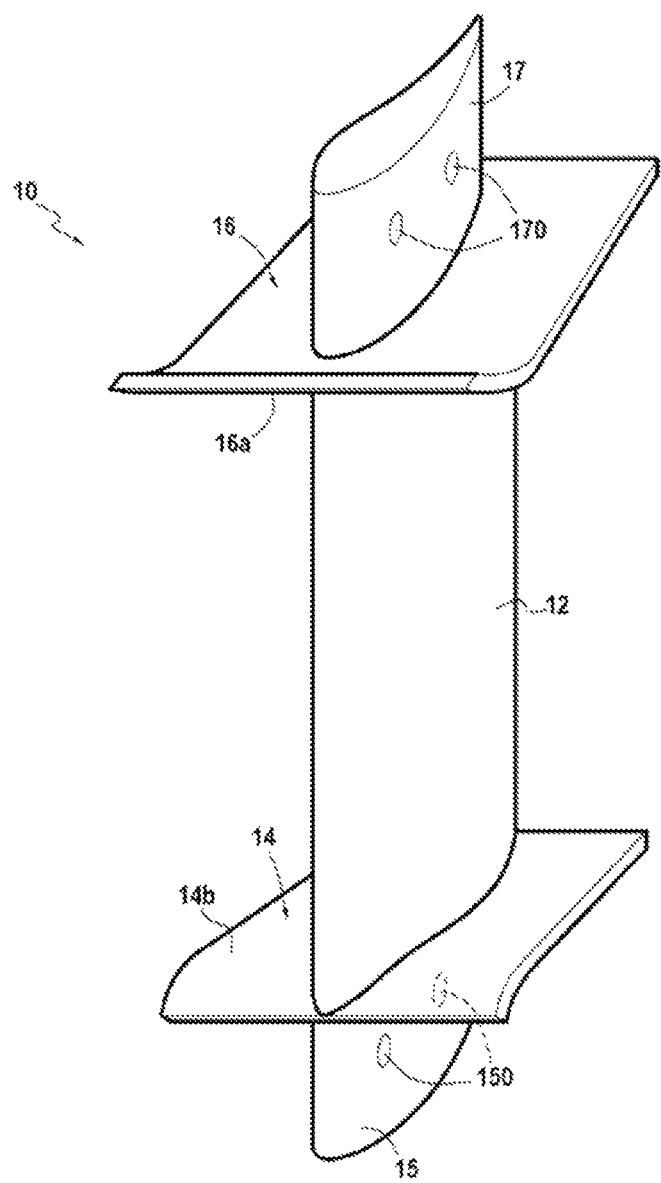

[Fig. 2]
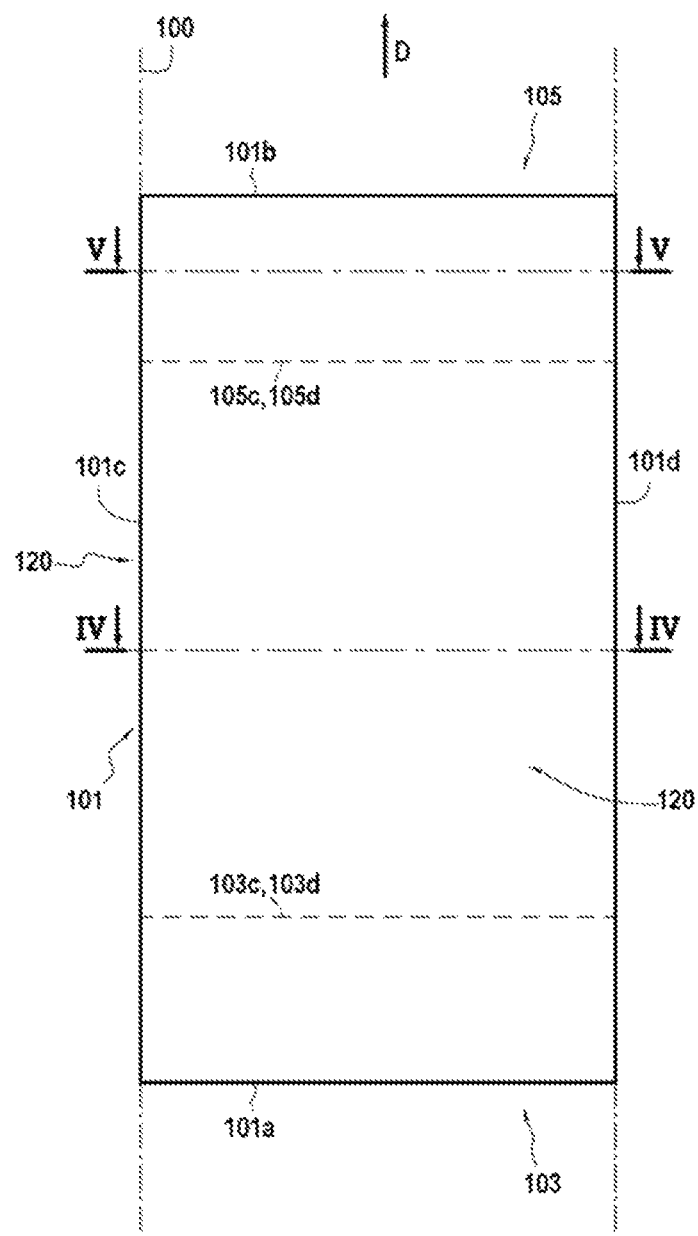

[Fig. 3]
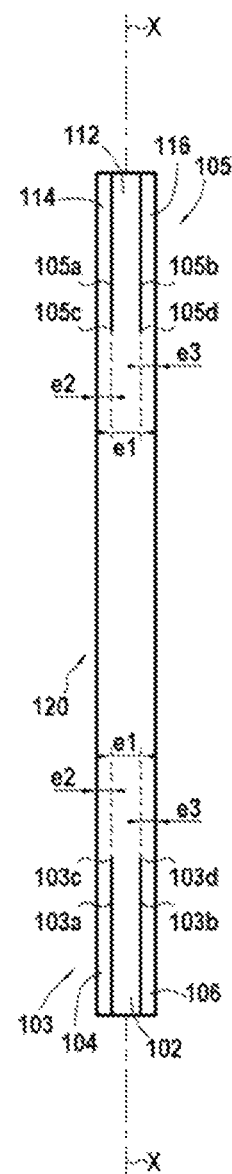

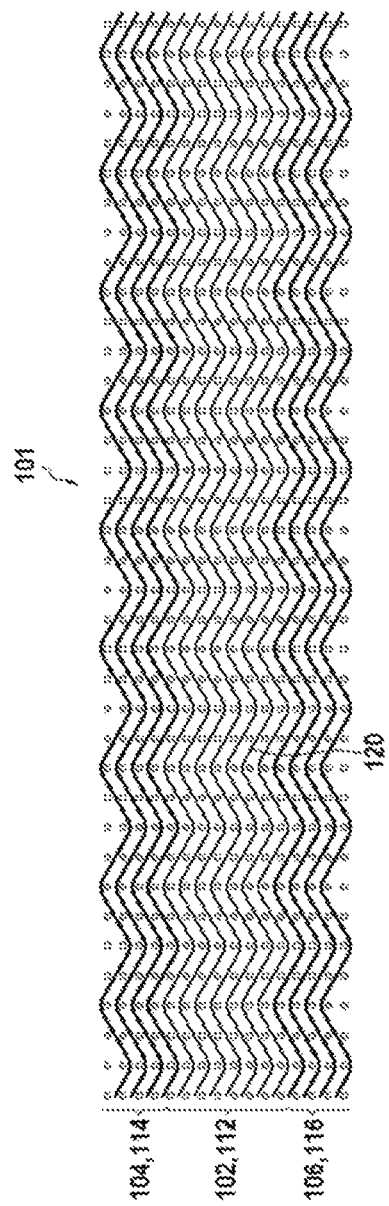

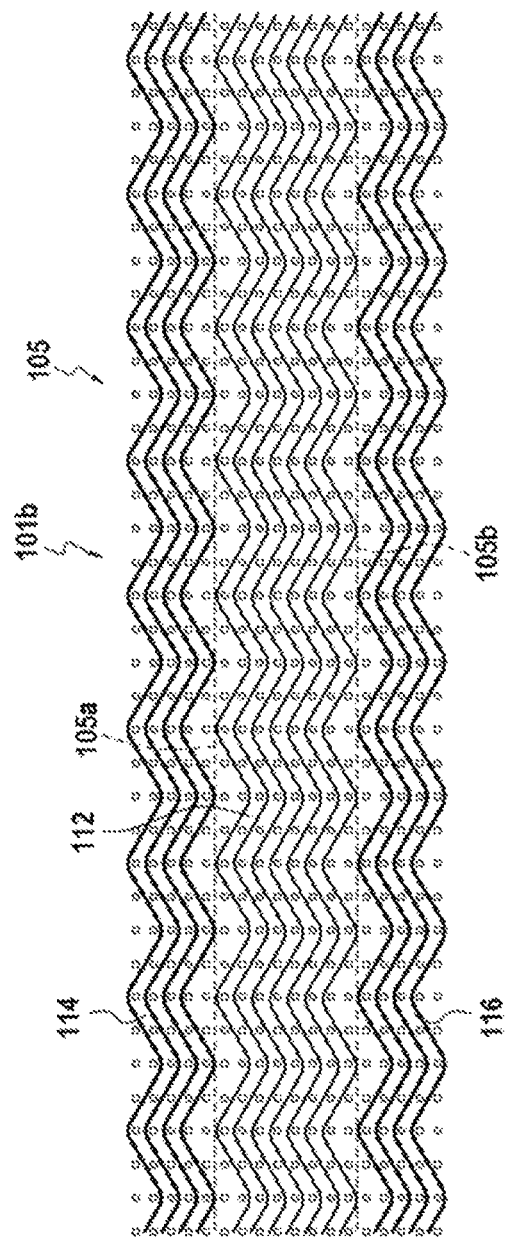

[Fig. 6]
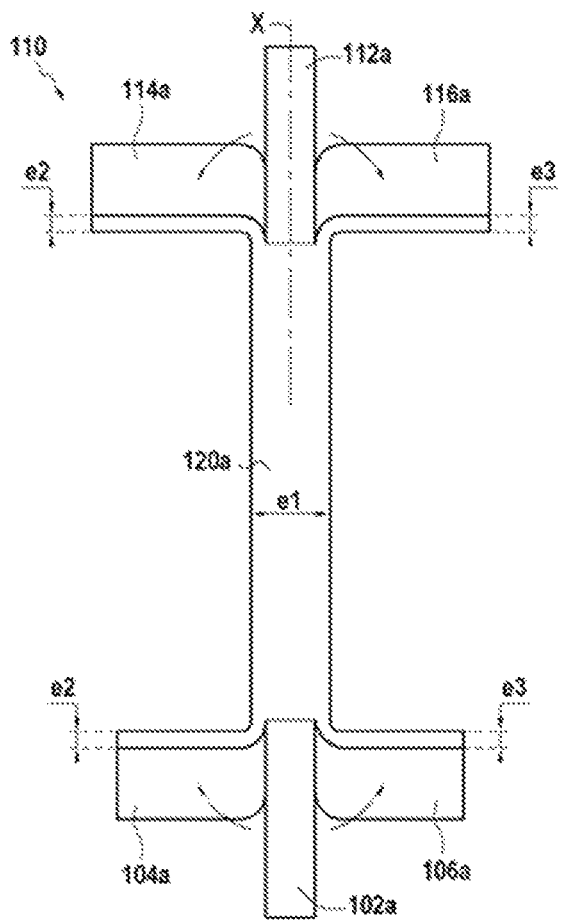
[Fig. 7]
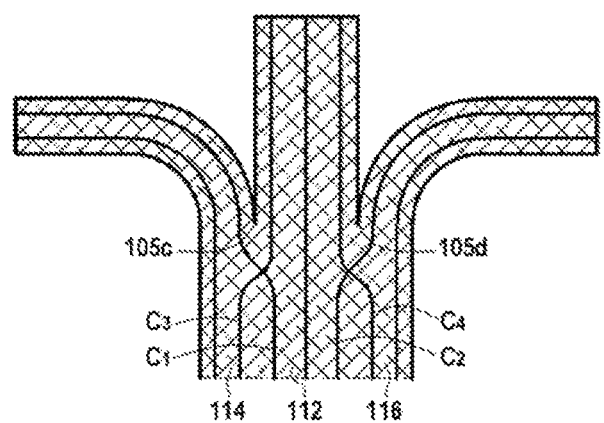

[Fig. 8]
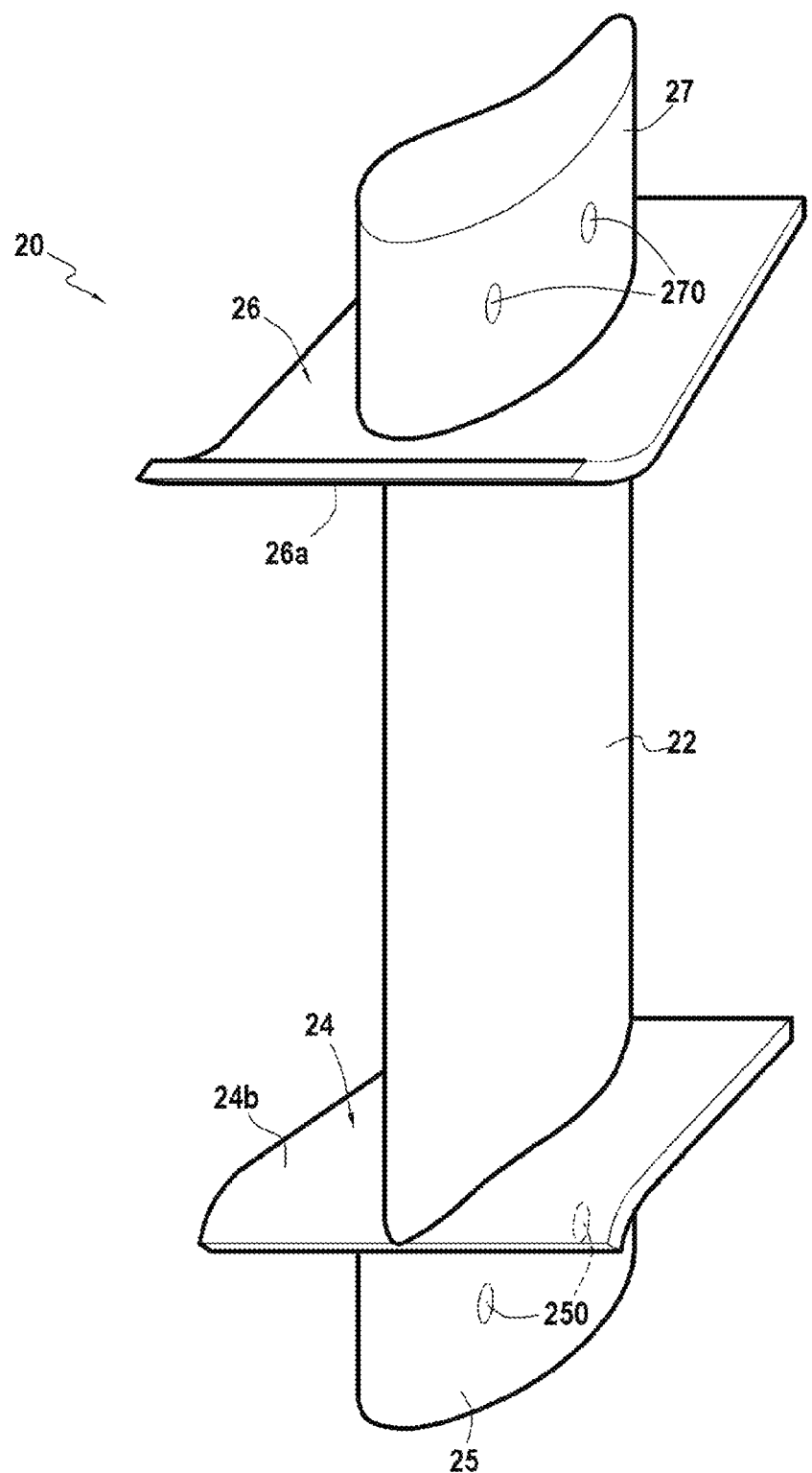

[Fig. 9]
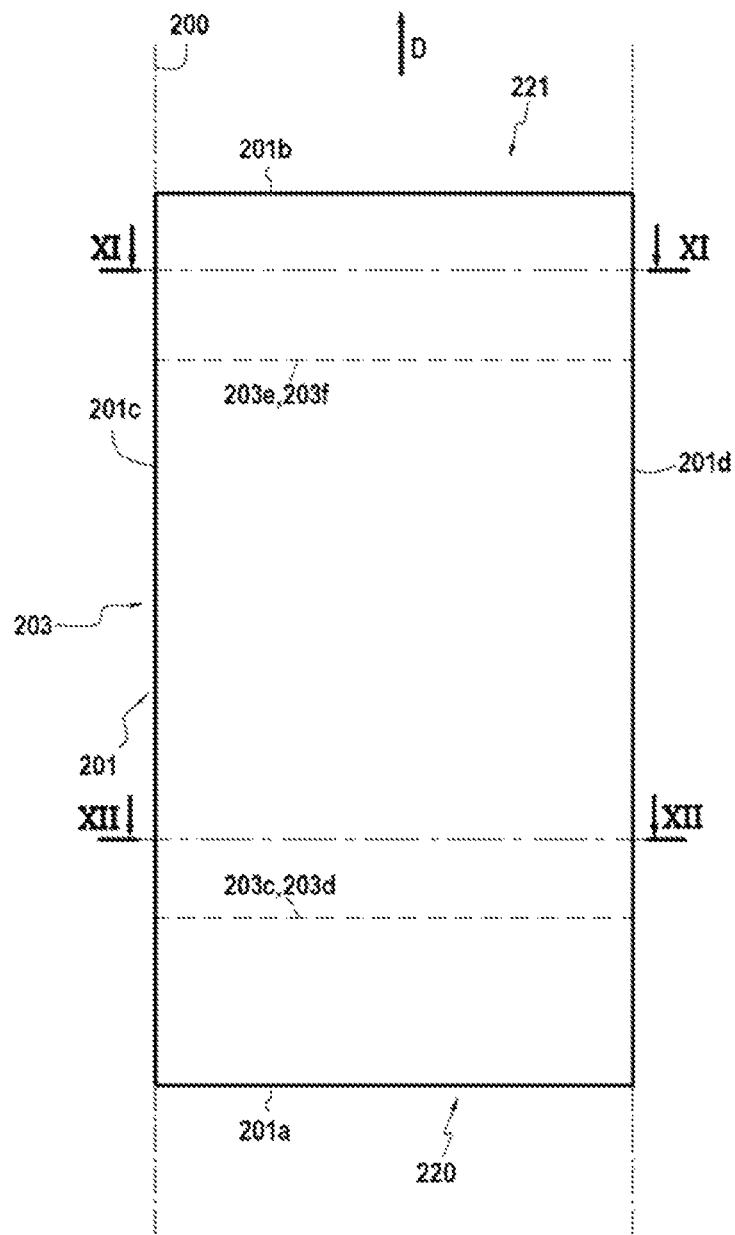

[Fig. 10]
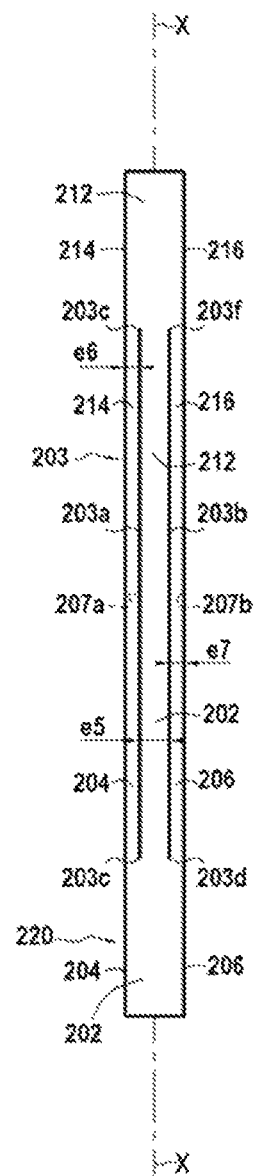

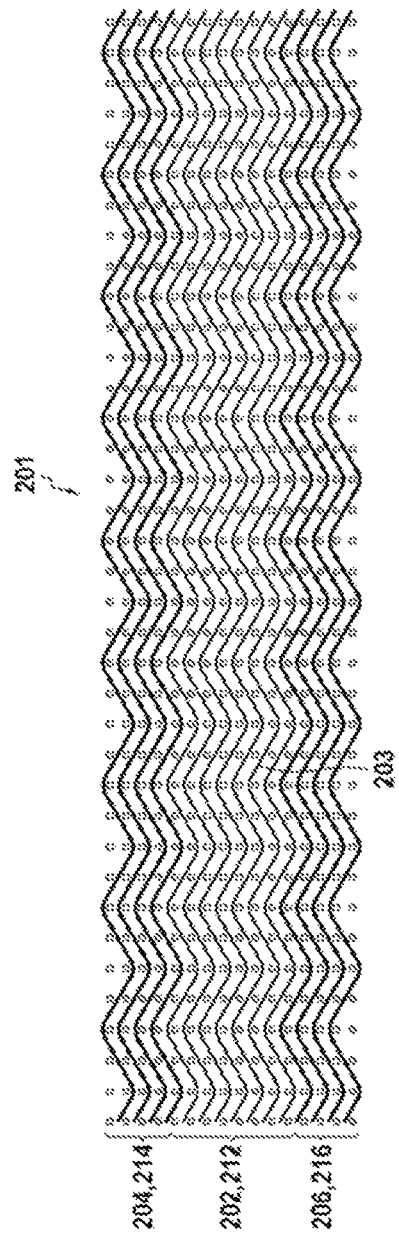

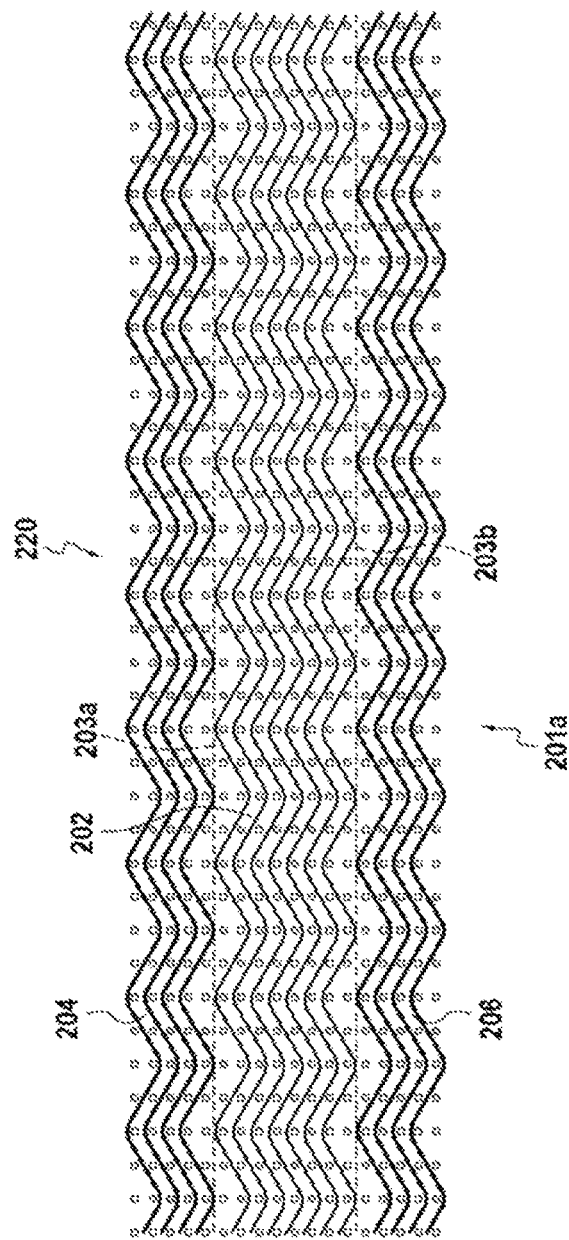
[Fig. 12]

[Fig. 13]
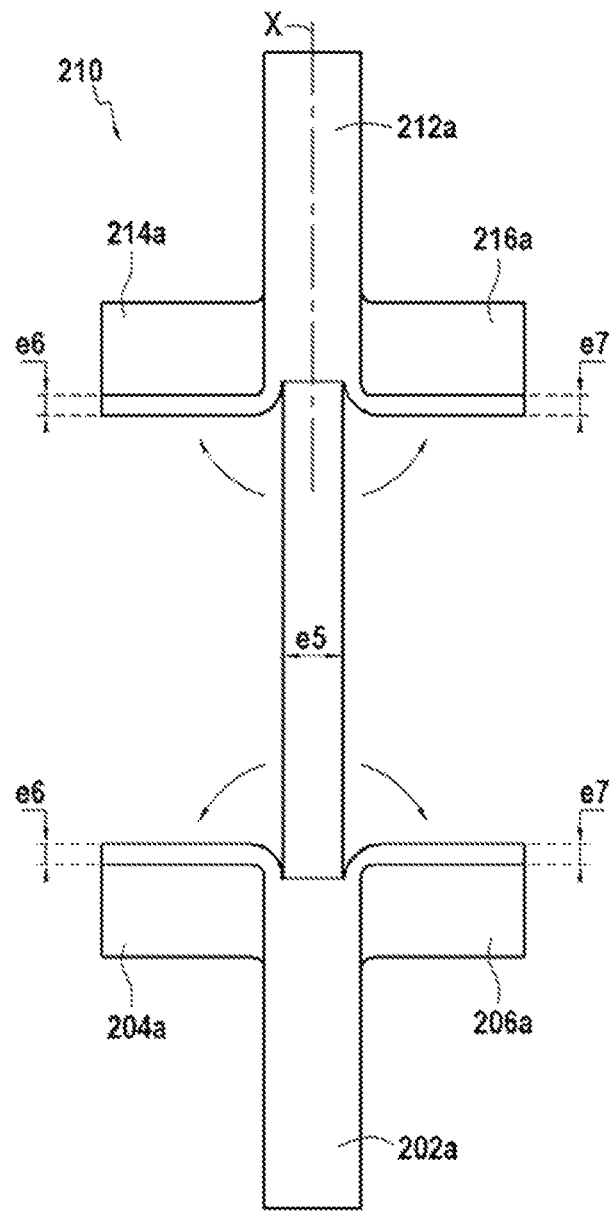

[Fig. 14]
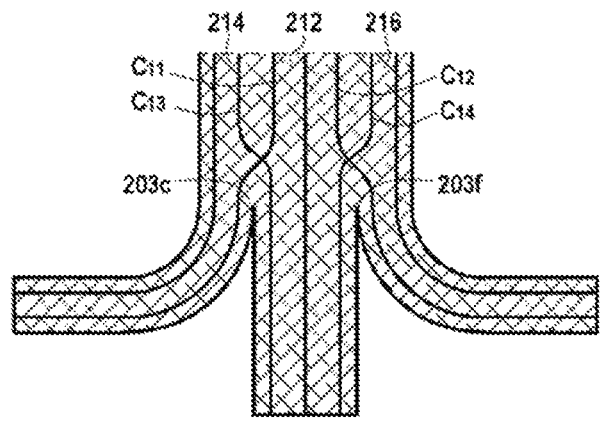

METHOD FOR MANUFACTURING A VANE MADE OF A COMPOSITE MATERIAL WITH INTEGRATED ATTACHMENT LUGS AND PLATFORMS

CROSS-REFERENCE TO RELATED APPLICATIONS

This application is the U.S. National Stage of PCT/FR2021/052066, filed Nov. 22, 2021, which in turn claims priority to French patent application number 20 12480 filed Dec. 1, 2020. The content of these applications are incorporated herein by reference in their entireties.

TECHNICAL FIELD

This invention relates to the general field of stator vanes for gas turbine aeronautical engines of "OGV" (for "outlet guide vane") type.

PRIOR ART

In the field of aeronautical engines, outlet guide vanes can be made of a composite material which offers a resistance equivalent to or greater than metal but with a lower overall mass. The document EP 3 186 486 describes a straightener guide vane made of composite material for a gas turbine engine comprising a matrix-densified fiber reinforcement, the fiber reinforcement being formed as a single part by three-dimensional weaving with a blade and attaching lugs extending from the inner and outer radial ends of the blade to opposite lateral faces of said blade.

An outlet guide vane must at once provide the aerodynamic guiding of the air, a function for which geometry is of prime importance, and provide the structural function of the part, i.e. transfer the engine forces between the hub and the take-up rods. For this purpose the vane is equipped with inner and outer platforms for delimiting the air path and transmitting the forces.

Furthermore, the vane must be capable of providing these two main functions after undergoing external aggressions (residue after bird ingestion, hail, erosion etc.).

Since outlet guide vanes are in the static load path, they are subject to a wide variety of situations of tensile, compressive, twisting and bending loads along with all the possible related combinations. It is therefore important that the attachments of these blades allow for homogenous behavior whatever the direction and type of stress.

Attachments of lug type extend at an angle substantially perpendicular to the longitudinal axis of the blade corresponding to the direction of the continuous warp yarns. Although composite material parts have very good mechanical properties in the directions of the fibers, these properties can be reduced in other directions. However, attachments of lug type under compression require work in the suboptimal directions of the composite material.

Studies have been carried out to analyze the mechanical resistance of outlet guide vanes with attachment by lugs secured to the blade of the vane. Results have shown a systematic concentration of stresses at the fillets between the lugs and the blade which may result in incipient cracks, matrix microcracks or breaks in the composite material at this place.

However, there is a need for a outlet guide vane made of composite material comprising incorporated platforms which does not have critical areas in its points of attachment to the other elements of the engine.

SUMMARY OF THE INVENTION

For this purpose, the invention makes provision for a method for manufacturing a fixed turbomachine vane made of composite material, the method including:

forming, by three-dimensional or multilayer weaving between a plurality of warp yarn layers and a plurality of weft yarn layers, a fiber blank having a longitudinal axis corresponding to that of the blade of the vane to be produced, the fiber blank extending between first and second longitudinal ends, the fiber blank being separated across its thickness into first, second and third parts in two non-interlinked areas respectively present at the longitudinal ends of the fiber blank, the first part being located between the second part and the third part to which it is connected by weaving outside said non-interlinked areas, forming, from the fiber blank, a preform of the vane to be produced, by unfolding, at each longitudinal end and on either side of the first part, segments of the second part and segments of the third part not interlinked with the first part, by shaping the unfolded segments of the second part and the unfolded segments of the third part to form preform parts for a platform of the vane to be manufactured at each longitudinal end of the fiber blank, the segments of the first part not interlinked with the segments of the second and third parts extending along the longitudinal axis to form a preform part for an attaching tab of the part to be manufactured at each longitudinal end of the fiber blank, densifying the preform by a matrix to obtain a fixed turbomachine vane made of composite material having an incorporated platform and an attaching tab at each longitudinal end.

With the method of the invention, a vane is obtained which has attaching tabs aligned with the longitudinal axis of the vane. This architecture makes it possible to dispense with any radius between the attaching tabs and the vane body. The vane is subjected at its attaching points to only traction and compression, i.e. only so in the direction of the continuous warp yarns of the fiber reinforcement of the vane. The vane thus obtained has a very good resistance as regards force take-ups. Furthermore, the formation of attaching tabs in the alignment of the vane body facilitates the incorporation of the non-interlinkings needed for the formation of the platforms.

According to a particular feature of the method of the invention, warp yarns present in the first part outside the non-interlinked areas are diverted in the second or third part into at least one non-interlinked area. This increases the mechanical resistance of the fiber preform at the bottoms of the non-interlinkings.

According to another particular feature of the method of the invention, the first part has a thickness greater than the thickness of the second and third parts. This reinforces the mechanical resistance of the attaching tabs which unlike the platforms are subject to tensile and compressive forces.

Another subject of the invention is a method for manufacturing a fixed turbomachine vane made of composite material, the method including:

forming, by three-dimensional or multilayer weaving between a plurality of warp yarn layers and a plurality of weft yarn layers, a fiber blank having a longitudinal axis corresponding to that of the blade of the vane to be produced, the fiber blank extending between first and second longitudinal ends, the fiber blank being separated across its thickness into first, second and third parts in a non-interlinked area extending between its longitudinal ends, the first part being located between the second part and the third part with which it is interlinked by weaving at the longitudinal ends of the fiber blank in such a way as to form two interlinking portions, cutting out the second and third parts to divide said second and third parts into two segments each, forming, from the fiber blank, a preform of the vane to be produced, by unfolding, on either side of the first part, the segments of the second part and the segments of the third part not interlinked with the first part, by shaping the unfolded segments of the second part and unfolded segments of the third part to form preform parts for a platform of the vane to be manufactured in the vicinity of so each longitudinal end of the fiber blank, the two interlinking portions between the first, second and third parts extending along the longitudinal axis to form a preform part for an attaching tab of the vane to be manufactured at each longitudinal end of the fiber blank, densifying the preform by a matrix to obtain a vane made of composite material having an incorporated platform and an attaching tab at each longitudinal end.

With the method of the invention, a vane is obtained which has attaching tabs aligned with the longitudinal axis of the vane. This architecture makes it possible to dispense with any radius between the attaching tabs and the vane body. The vane thus works at its attaching points only in traction and in compression, i.e. solely in the direction of the continuous warp yarns of the fiber reinforcement of the vane. The vane thus obtained has a very good resistance as regards force take-ups, the thickest portions of the vane corresponding to the attaching tabs. Furthermore, the formation of the attaching tabs in the alignment of the body of the vane facilitates the incorporation of the non-interlinkings needed for the formation of the platforms.

According to a particular feature of the method according to the invention, warp yarns present in the first part in at least one interlinking portion are diverted in the second or third part into the non-interlinked area. This increases the mechanical resistance of the fiber preform at the bottoms of the non-interlinkings.

According to another particular feature of the method according to the invention, the first part has a greater thickness than the thickness of the second and third parts. This reinforces the resistance of the blade of the vane which is the part of the vane the most exposed to impacts with objects.

The invention further relates to a fixed turbomachine vane made of composite material comprising a matrix-densified fiber reinforcement, the vane having a blade extending along a longitudinal axis and two platforms secured to the blade and respectively present at the two longitudinal ends of the vane, characterized in that the vane further comprises first and second attaching tabs respectively present at each of the longitudinal ends of the vane and extending along the longitudinal axis and in that the fiber reinforcement has a three-dimensional or multilayer weave, the fiber reinforcement comprising a blade preform part dividing at each of its longitudinal ends into two inner or outer platform preform half-parts secured to the blade preform part and an inner or outer attaching tab preform part secured to the blade preform part, each inner or outer attaching tab preform part extending along the longitudinal axis between the inner or outer platform preform half-parts.

According to a particular feature of the method according to the invention, warp yarns present in the blade preform part of the fiber reinforcement are diverted into an inner or outer platform preform half-part.

According to another particular feature of the method according to the invention, the blade preform part of the fiber reinforcement has a thickness greater than the thickness of the inner or outer platform preform half-parts.

The invention further relates to a fixed turbomachine vane made of composite material comprising a matrix-densified fiber reinforcement, the vane having a blade extending in a longitudinal axis and two platforms secured to the blade and respectively present at the two longitudinal ends of the vane, characterized in that the vane further comprises first and second attaching tabs respectively present at each of the longitudinal ends of the vane and extending along the longitudinal axis and in that the fiber reinforcement has a three-dimensional or multilayer weave, the fiber reinforcement comprising a blade preform part meeting again at each of its longitudinal ends with two inner or outer platform preform half-parts secured to the blade preform part in such a way as to form an inner or outer attaching tab preform part secured to the blade preform part, each inner or outer attaching tab preform part extending along the longitudinal axis.

According to a particular feature of the method according to the invention, warp yarns present in the inner or outer attaching tab part of the fiber reinforcement are diverted into an inner or outer platform preform half-part.

According to another particular feature of the method according to the invention, the blade preform part of the fiber reinforcement has a thickness greater than the thickness of the inner or outer platform preform half-parts.

BRIEF DESCRIPTION OF THE DRAWINGS

FIG. 1 is a schematic perspective view of a turbomachine vane in accordance with an embodiment of the invention, FIG. 2 is a schematic plane view of a woven fiber blank intended for the production of a fiber preform for a vane of the type of that of FIG. 1, FIG. 3 is a lateral view of the blank of FIG. 2, FIG. 4 is a magnified schematic view of weaving planes of the blank of FIG. 2 in section view along the plane IV-IV of FIG. 2, FIG. 5 is a magnified schematic view of weave planes of the blank of FIG. 2 in section view along the plane V-V of FIG. 2, FIG. 6 is a schematic view showing the embodiment of a vane preform based on the fiber blank of FIGS. 2 to 5, FIG. 7 is a partial section view of the vane preform of FIG. 6, FIG. 8 is a schematic perspective view of a turbomachine vane in accordance with another embodiment of the invention, FIG. 9 is a schematic plane view of a woven fiber blank intended for the production of a fiber preform for a vane of the type of that of FIG. 8, FIG. 10 is a lateral view of the blank of FIG. 9, FIG. 11 is a magnified schematic view of weaving planes of the blank of FIG. 9 in section view along the plane XI-XI of FIG. 9, FIG. 12 is a magnified schematic view of weaving planes of the blank of FIG. 9 in section view along the plane V-V of FIG. 9, FIG. 13 a schematic view showing the production of a vane preform from the fiber blank of FIGS. 9 to 12, FIG. 14 is a partial section view of the vane preform of FIG. 13.

DESCRIPTION OF THE EMBODIMENTS

FIG. 1 very schematically shows a vane 10, for example an OGV (Outlet Guide Vane) 10 of a secondary flow straightener of an aeronautical turbomachine. The vane 10 comprises a blade 12, inner 14 and outer 16 platforms and inner 15 and outer 17 attaching tabs extending in the longitudinal direction of the blade 12 of the vane 10.

Throughout the text, the terms "inner" and "outer" are used with reference to the radial position with respect to the turbomachine axis.

The outer face 14b of the platform 14 and the inner face 16a of the platform 16 are intended to delimit the gas flow path through the turbine after assembling the vane 10 in a turbine casing. The inner attaching tab 15 is intended to allow the attaching of the vane 10 to a hub of the turbomachine via attaching orifices 150 while the outer attaching tab 17 is intended to allow the attachment of the vane 10 to a shroud of the turbomachine via attaching orifices 170.

The blade 12 extends between the platforms 14 and 16 and the attaching tabs 15 and 17, to which it is secured. The attaching tabs 15 and 17 are solid elements not containing any cavity extending in the longitudinal direction of the blade 12.

The vane 10 is made of composite material. Its manufacturing comprises the formation of a fiber preform having a shape corresponding to that of the vane and the densification of the preform by a matrix.

FIG. 2 shows in the plane a fiber blank 101 from which a fiber preform of the vane 10 can be formed.

The blank 101 is obtained from a strip 100 woven by three-dimensional (3D) or multilayer weaving, the strip 100 extending in a general direction D corresponding to the longitudinal direction of the vane to be manufactured. The weaving is carried out for example with warp yarns extending in the direction D, it being noted that a weave with weft yarns extending in this direction is also possible. A plurality of blanks 101 can be woven one after another in the direction D. It is also possible to simultaneously weave several parallel rows of blanks 101.

In the embodiment of FIGS. 2 to 5, a blank 101 extending along a longitudinal axis X comprises, across its thickness and at each of its ends 101a and 101b, a first part 102, 112, a second part 104, 114 and a third part 106, 116. The part 102 is located between the part 104 and the part 106. The part 102 is interlinked with the parts 104 and 106 by 3D weaving in an area 120 intended to form the blade of the vane and not interlinked with the parts 104 and 106 at a non-interlinked area 103 comprising a first non-interlinking 103a between the part 102 and the part 104 and a second non-interlinking 103b between the part 102 and the part 106. The non-interlinkings 103a, 103b extend over the whole width of the blank 101 (dimension in the weft direction) from the end 101a of the blank 101 all the way to the bottoms of the non-interlinkings 103c and 103d. The bottoms of the non-interlinkings 103c and 103d extend between the longitudinal edges 101c and 101d of the blank 101 along the weft direction.

The part 112 is located between the part 114 and the part 116 and is interlinked with the parts 114 and 116 by 3D weaving in the area 120 intended to form the blade of the vane and non-interlinked with the parts 114 and 116 at a non-interlinked area 105 comprising a first non-interlinking 105a between the part 112 and the part 114 and a second non-interlinking 105b between the part 112 and the part 116. The non-interlinkings 105a, 105b extend over the whole width of the blank 101 from the end 101b of the blank 101 to the bottoms of the non-interlinkings 105c and 105d. The bottoms of the non-interlinkings 105c and 105d extend between the longitudinal edges 101c and 101d of the blank 101.

In a known manner, a non-interlinking is fashioned between two layers of warp yarns deliberately omitting to pass a weft yarn through the non-interlinked area to bind warp layer yarns located on either side of the non-interlinked area.

The planes of FIGS. 4 and 5 show an example of 3D weaving with interlock weave and non-interlinkings 105a and 105b, the non-interlinkings 103a and 103b being obtained in the same way as the non-interlinkings 105a and 105b. In FIG. 5, the non-interlinkings are shown by dashes. The part 112 comprises a plurality of warp yarn layers (8 in the illustrated example) which are interlinked by 3D weaving. The parts 114 and 116 each comprise a plurality of warp yarn layers (4 in the illustrated example) which are interlinked by 3D weaving. Between the non-interlinked area 103 delimited by the bottoms of the non-interlinkings 103c and 103d and the non-interlinked area 105 delimited by the bottoms of the non-interlinkings 105c and 105d, the warp yarn layers of the parts 102, 112, 104, 114 and 106, 116 are, in the illustrated example, all interlinked (FIG. 4).

After weaving, a fiber preform 110 is formed from the blank 101. More precisely, the segment 120a located in the center of the preform 110 corresponds to a blade preform part. The segments 104a, 114a and 106a, 116a of the parts 104, 106, 114, 116 not interlinked with the parts 102 and 112 and present at the longitudinal ends of the segment 120a are unfolded or deployed as shown in FIG. 6 with a view to forming each of the preform half-parts for the platforms 14, 16, of the segments 104a, 114a being adjacent to the non-interlinkings 103a, 105a and the segments 106a, 116a being adjacent to the non-interlinkings 103b, 105b. The unfoldings are produced at the bottoms of the non-interlinkings.

In accordance with the invention, the segments 102a and 112a intended to respectively form an inner attaching tab preform part and an outer attaching tab preform part are left in their position parallel to the longitudinal direction X of the blank.

This forms a fiber reinforcement for the vane 10 to be produced which comprises a blade preform part 120a dividing at each of its longitudinal ends into two inner or outer platform preform half-parts 104a, 106a and 114a, 116a secured to the blade preform part and an inner or outer attaching tab preform part 102a, 112a secured to the blade preform part The fiber preform 110 of the vane to be manufactured is then placed in a shaping tool to obtain the desired blade profile and the desired shapes for the platforms and attaching tabs.

A vane made of ceramic matrix composite (CMC) material such as that of FIG. 1 can be manufactured as follows.

A fiber strip 100 is woven by three-dimensional weaving, comprising a plurality of fiber blanks 101 oriented for example in the warp direction, with non-interlinked areas, as shown in FIG. 2. Ceramic yarns can be used for the weaving, particularly yarns made of silicon carbide (SiC), for example those marketed under the name "Nicalon" by the Japanese company Nippon Carbon. Other ceramic yarns are usable, particularly refractory oxide yarns, such as yarns made of aluminum oxide $Al_2O_3$, in particular for CMC materials of oxide-oxide type (fibers of the fiber reinforcement and refractory oxide matrix). Carbon yarns could also be used for a CMC material with carbon fiber reinforcement.

In a known manner, the fiber strip can be processed to eliminate the sizing present on the fibers and the presence of oxide on the surface of the fibers.

Also in a known manner, a thin layer of embrittlement-release interphase coating can then be formed on the fibers of the fiber strip by CVI ("Chemical Vapor Infiltration"). The interphase material is for example pyrolytic carbon PyC, boron nitride BN or boron-doped carbon BC. The thickness of the formed layer is for example between 10 nanometers and 100 nanometers to retain a deformation capacity in the fiber blanks.

The fiber strip is then impregnated by a consolidating composition, typically a carbon precursor resin or a ceramic precursor resin, where applicable diluted in solvent. After drying, the individual fiber blanks are cut out. Each blank is shaped (as illustrated by FIG. 6) and placed in a tool for shaping the blade preform parts, the inner and outer platforms and the inner and outer attaching tabs.

Next, the resin is cured then pyrolyzed after removing the preform from the shaping tool to obtain a blade preform consolidated by the pyrolysis residue. The quantity of consolidating resin is chosen to be sufficient but without too much excess so that the pyrolysis residue interlinks the fibers of the preform in order for it to be handleable while keeping its shape without the assistance of a tooling.

A second embrittlement-release interphase coating layer can be formed by CVI, for example made of PyC, BN or BC. The production of an interphase coating in two layers, before and after consolidation, is described in the document EP 2 154 119.

A densification by ceramic matrix of the consolidated preform is then made, for example by CVI. The matrix can be made of SiC or be a self-healing matrix comprising matrix phases of pyrolytic carbon PyC, of boron carbide B4C or of a ternary system Si—B—C as described in documents U.S. Pat. Nos. 5,246,756 and 5,965,266 in particular. Other types of ceramic matrix can be envisioned, particularly refractory oxide matrices, for example made of aluminum, in particular for oxide-oxide type CMC materials.

The vane can also be manufactured from a CMO organic matrix composite material (thermoplastic or thermosetting with fiber preform of any type). In this case, the densification of the fiber preform is obtained in a manner known per se following the liquid method.

The liquid method consists in impregnating the fiber preform with a resin. The preform is placed in a mold which can be closed in a sealed manner with a housing having the shape of the molded final part. Next, the resin is injected, for example a thermoplastic or thermosetting resin, into the entire housing to impregnate the entire fiber part of the preform.

Polymerization is done by a heat treatment (generally by heating the mold). Since the preform is still held in the mold, it has a shape corresponding to that of the part to be produced. The organic matrix can in particular be obtained from epoxide resins.

Once the preform is densified by the matrix, a vane is obtained, the geometry of which corresponds to the final vane 10 of FIG. 1. The inner attaching tab is then machined to form the attaching orifices 150 and the outer attaching tab to form the attaching orifices 170.

According to a feature of the invention, the first parts 102, 112 have a thickness $e_1$ greater than the thickness $e_2$ of the second parts 104, 114 and than the thickness $e_3$ of the third parts 106, 116 (FIG. 3). In the example illustrated in FIGS. 4 and 5, the second and third parts 114 and 116 each comprise 4 layers of warp yarn while the first part 112 comprises 8 layers of warp yarn. The same applies for the first, second and third parts 102, 104 and 106 not shown in FIGS. 4 and 5.

The routing of the warp wires in the fiber preform can be straight, i.e. the warp yarns do not cross and the same warp yarns remain present in the first, second and third parts 102, 104 and 106 outside and inside the non-interlinked areas. According to a variant embodiment illustrated in FIG. 7, certain warp yarns present in the first part 112 outside the non-interlinked area 105, here warp yarns $C_1$ and $C_2$, are diverted in the second and third parts 114 and 116 at the non-interlinked area 105. Warp yarns present in the second and third parts 114 and 116 outside the non-interlinked area 105, here warp yarns $C_3$ and $C_4$ can also be diverted in the first part 112 at the non-interlinked area 105. This increases the mechanical resistance of the fiber preform on the bottoms of the non-interlinkings 105c and 105d. The same can apply for warp yarns of the first, second and third parts 102, 104 and 106 not shown in FIG. 7.

FIG. 8 very schematically shows a vane 20 according to another embodiment of the invention. The vane 20, for example an OGV (Outlet Guide Vane) of a straightener of a secondary flow of an aeronautical turbomachine, a blade 22, inner 24 and outer 26 platforms and inner 25 and outer 27 attaching tabs extending in the longitudinal direction of the blade 22 of the vane 20. The outer face 24b of the platform 24 and the inner face 26a of the platform 26 are intended to delimit the gas flow path in the turbine after assembly of the vane 20 in a turbine casing. The inner attaching tab 25 is intended to allow the attaching of the vane 20 to a hub of the turbomachine via attaching orifices 250 while the outer attaching tab 27 is intended to allow the attaching of the vane 20 to a shroud of the turbomachine via attaching orifices 270. The vane 22 extends between the platforms 24 and 26 and the attaching tabs 25 and 27, to which it is secured. The attaching tabs 25 and 27 are solid elements not containing any cavity extending in the longitudinal direction of the blade 12.

The vane 20 is made of composite material. Its fabrication comprises the formation of a fiber preform having a shape corresponding to that of the blade and the densification of the preform by a matrix.

FIG. 9 shows in the plane a fiber blank 201 from which a fiber preform of the vane 20 can be formed.

The blank 201 is obtained from a strip 200 woven by three-dimensional (3D) or multilayer weaving, the strip 200 extending in a general direction D corresponding to the longitudinal direction of the vane to be manufactured. The weaving is done for example with warp yarns extending in the direction D, it being noted that a weave with weft yarns extending in this direction is also possible. A plurality of blanks 201 can be woven one after the other in the direction D. It is also possible to simultaneously weave several parallel rows of blanks 201.

In the embodiment of FIGS. 10 to 12, a blank 201 extending along a longitudinal axis X comprises, across its thickness and at each of its ends 201a and 201b, a first part 202, 212, a second part 204, 214 and a third part 206, 216. The part 202 is located between the part 204 and the part 206. The part 202 is interlinked with the parts 204 and 206 by 3D weaving in an interlinking area or portion 220 intended to form the inner attaching tab of the vane and non-interlinked with the parts 204 and 206 at a non-interlinked area 203 comprising a first interlinking 203a between the part 102 and the part 104 and a second interlinking 203b between the part 202 and the part 206. The non-interlinkings 203a and 203b extend over the whole width of the blank 201 (dimension in the weft yarn) between the bottoms of the non-interlinkings 203c and 203d and the bottoms of the non-interlinkings 203e and 203f. The bottoms of the non-interlinkings 203c, 203d, 203e and 203f extend between the longitudinal edges 201c and 201d of the blank 201 along the weft direction.

The part 212 is located between the part 214 and the part 216 and is interlinked with the parts 214 and 216 by 3D weaving in an interlinking area or portion 221 intended to form the outer attaching tab of the vane and not interlinked with the parts 214 and 216 at the non-interlinked area 203 comprising the first non-interlinked area 203a between the part 212 and the part 214 and the second non-interlinked area 203b between the part 212 and the part 216.

In a well-known way, a non-interlinking is fashioned between two warp yarn layers, deliberately omitting to pass a weft yarn through the non-interlinked area to interlink warp layer yarns located on either side of the non-interlinked area.

The drawings of FIGS. 11 and 12 show an example of 3D with interlocks and non-interlinked areas 203a and 203b. In FIG. 12, the non-interlinkings are shown by dashes. The part 202 comprises a plurality of warp yarn layers (8 in the illustrated example) which are linked by 3D weaving. The parts 204 and 206 each comprise a plurality of warp yarn layers (4 in the illustrated example) which are interlinked by 3D weaving. In the interlinking portion 220, the warp yarn layers of the parts 203, 204 and 206 are, in the illustrated example, all interlinked with one another (FIG. 11). The same applies for the parts 212, 214 and 216 in the interlinking portion 221.

After weaving, a fiber preform 210 is formed based from the blank 201. More precisely, the parts 204 and 214, on the one hand, and 206 and 216, on the other hand, in the non-interlinked area 203 are separated by making respective cuts 207a and 207b (FIG. 10). Once the parts 204, 214, 206 and 216 are released, the segments 204a, 214a and 206a, 216a of the parts 204, 206, 214, 216 not interlinked with the parts 202 and 212 are unfolded or deployed as shown in FIG. 13 with a view to forming each of the preform half-parts for the platforms 24, 26. The unfoldings are done at the bottoms of the non-interlinkings. The segment 220a located at the center of the preform 210 corresponds to a blade preform part.

In accordance with the invention, segments 202a and 212a intended to respectively form an inner attaching tab preform part and an outer attaching tab preform part are left in their position parallel to the longitudinal direction X of the blank.

This forms a fiber reinforcement for the vane 20 to be produced which comprises a blade preform part 220a meeting again at each of its longitudinal ends with two inner or outer platform preform half-parts 204a, 206a; 214a, 216a secured to the blade preform part in such a way as to form an inner or outer attaching tab preform part 202a; 212a secured to the blade preform part.

The fiber preform 210 of the vane to be manufactured is then placed in a shaping tool to obtain the desired blade profile and the desired shapes for the platforms and attaching tabs.

A vane made of ceramic matrix composite (CMC) material such as that of FIG. 8 can be manufactured in the ways escribed previously for the vane of FIG. 1 and is therefore not repeated again here for the sake of simplicity. Once the preform is densified by the matrix, a vane is obtained, the geometry of which corresponds to the final vane 20 of FIG. 8. The inner attaching tab is then machined to form the attaching orifices 250 and the outer attaching tab to form the attaching orifices 270.

According to an aspect of the invention, the first parts 202, 212 have a thickness $e_4$ greater than the thickness $e5$ of the second parts 204, 214 and than the thickness $e6$ of the third parts 206, 216. In the example illustrated in FIGS. 11 and 12, the second and third parts 214 and 216 each comprise 4 warp yarn layers while the first part 212 comprises 8 warp yarn layers. The same applies for the first, second and third parts 202, 204 and 206 not shown in FIGS. 11 and 12.

In the same way as for the fiber preform of the vane 10 described previously, the routing of the warp yarns in the fiber preform can be straight, i.e. the warp yarns do not cross and the same warp yarns remain present in the first, second and third parts 202, 204 and 206 outside and inside the non-interlinked areas. According to a variant embodiment illustrated in FIG. 14, certain warp yarns present in the first part 202 outside the non-interlinked area 203, here warp yarns $C_{11}$ and $C_{12}$, are diverted in the second and third parts 204 and 206 at the non-interlinked area 203. Warp yarns present in the second and third parts 204 and 206 outside the non-interlinked area 203, here warp yarns $C_{13}$ and $C_{14}$ can also be diverted in the first part 202 at the non-interlinked portion 220. This increases the mechanical resistance of the fiber preform at the bottoms of the non-interlinkings 203c and 203d. The same can apply for warp yarns of the first, second and third parts 212, 214 and 216 not shown on FIG. 14.

The invention claimed is:

1. A method for manufacturing a fixed turbomachine vane made of composite material, the method comprising:
forming, by three-dimensional or multilayer weaving between a plurality of warp yarn layers and a plurality of weft yarn layers, a fiber blank having a longitudinal axis corresponding to that of a blade of the vane to be produced, the fiber blank extending between first and second longitudinal ends, the fiber blank being separated across its thickness into first, second and third parts in two non-interlinked areas respectively present at the longitudinal ends of the fiber blank, the first part being located between the second part and the third part, the first part being connected to both the second part and the third part by weaving outside said non-interlinked areas,
forming, from the fiber blank, a preform of the vane to be produced, by unfolding, at each longitudinal end and on either side of the first part, the entire second part and the entire third part not interlinked with the first part, and by shaping the unfolded entire second part and the unfolded entire third part to form preform parts for a platform of the vane to be manufactured at each longitudinal end of the fiber blank, the first part not interlinked with the entire second and third parts, extending along the longitudinal axis to form a preform part for a tab for attaching the fixed turbomachine vane to be manufactured at each longitudinal end of the fiber blank, and densifying the preform by a matrix to obtain the fixed turbomachine vane made of composite material having an incorporated platform and an attaching tab at each longitudinal end aligned with the longitudinal axis of the vane, wherein an entire area of the fiber blank intended to form the blade of the vane between the platforms is an interlock 3D weaving formed by continuously interlinking the first part of the fiber blank with the second and third parts of the fiber blank, wherein the first part has a thickness greater than a thickness of the second and third parts.

2. The method as claimed in claim 1, wherein warp yarns present in the first part outside the non-interlinked areas are diverted in the second part or the third part into at least one non-interlinked area.

3. A method for manufacturing a fixed turbomachine vane made of composite material, the method comprising:

forming, by three-dimensional or multilayer weaving between a plurality of warp yarn layers and a plurality of weft yarn layers, a fiber blank having a longitudinal axis corresponding to that of a blade of the vane to be produced, the fiber blank extending between first and second longitudinal ends, the fiber blank being separated across a thickness into first, second and third parts in a non-interlinked area extending between the longitudinal ends, the first part being located between the second part and the third part, the first part being connected to both the second part and the third part by weaving at the longitudinal ends of the fiber blank in such a way as to form two interlinking portions, cutting out the second and third parts to divide each of said second and third parts into two segments, forming, from the fiber blank, a preform of the vane to be produced, by unfolding, on either side of the first part, the two segments of the second part and the two segments of the third part that are not interlinked with the first part, and by shaping the unfolded two segments of the second part and the unfolded two segments of the third part that are not interlinked with the first part to form preform parts for a platform of the vane to be manufactured in the vicinity of each longitudinal end of the fiber blank, the two interlinking portions between the first, second and third parts extending along the longitudinal axis to form a preform part for an attaching tab of the vane to be manufactured at each longitudinal end of the fiber blank, and densifying the preform by a matrix to obtain a vane made of composite material having an incorporated platform and an attaching tab at each longitudinal end aligned with the longitudinal axis of the vane, wherein an entire area of the fiber blank intended to form the attaching tab at each longitudinal end of the vane is an interlock 3D weaving formed by continuously interlinking the first part of the fiber blank with the second and third parts of the fiber blank, wherein the first part has a thickness greater than a thickness of the second and third parts.

4. The method as claimed in claim 3, wherein warp yarns present in the first part in at least one interlinking portion are diverted in the second part or the third part into the non-interlinked area.

5. A fixed turbomachine vane made of composite material comprising a matrix-densified fiber reinforcement, the vane having a blade extending along a longitudinal axis and two platforms secured to the blade and respectively present at the two longitudinal ends of the vane, wherein the vane further comprises first and second attaching tabs respectively present at each of the longitudinal ends of the vane and extending along the longitudinal axis and the fiber reinforcement has a three-dimensional or multilayer weave between a plurality of warp yarn layers and a plurality of weft yarn layers, the fiber reinforcement comprising a blade preform part dividing, at each of said two longitudinal ends and across a thickness of the blade preform part, into two inner or outer platform preform half-parts secured to the blade preform part and an inner or outer attaching tab preform part secured to the blade preform part such that the thickness of the blade preform part between the two platforms of the vane is greater than a thickness of each of the two inner or outer platform preform half-parts secured to the blade preform part and a thickness of the inner or outer attaching tab preform part secured to the blade preform part, the inner or outer attaching tab preform part at one of the two longitudinal ends extending along the longitudinal axis between the inner or outer platform preform half-parts, wherein, in the blade preform of the fiber reinforcement, all the warp yarns of the plurality of warp yarn layers are linked together by weft yarns of the plurality of weft yarn layers, and wherein the thickness of the inner or outer attaching tab preform part secured to the blade preform part is greater than the thickness of each of the two inner or outer platform preform half-parts secured to the blade preform part.

6. The vane as claimed in claim 5, wherein warp yarns are diverted into the two inner or outer platform preform half-parts.

7. A fixed turbomachine vane made of composite material comprising a matrix-densified fiber reinforcement, the vane having a blade extending in a longitudinal axis and two platforms secured to the blade and respectively present at the two longitudinal ends of the vane, wherein the vane further comprises first and second attaching tabs respectively present at each of the longitudinal ends of the vane and extending along the longitudinal axis and the fiber reinforcement has a three-dimensional weave, the fiber reinforcement comprising a blade preform part that is integral, at each of said two longitudinal ends, with two inner or outer platform preform half-parts secured to the blade preform part in such a way as to form an inner or outer attaching tab preform part secured to the blade preform part, each inner or outer attaching tab preform part at one of the two longitudinal ends extending along the longitudinal axis, wherein, in the blade preform part of the fiber reinforcement, all the warp yarns of the plurality of warp yarn layers are linked together by weft yarns of the plurality of weft yarn layers, wherein each of said inner or outer attaching tab preform part at one of the two longitudinal ends is separated across a thickness into said two inner or outer platform preform half-parts and said blade preform part such that a thickness of each of said inner or outer attaching tab preform part is greater than a thickness of each said two inner or outer platform preform half-parts and a thickness of said blade preform part between the two platforms secured to the blade, and wherein the thickness of the inner or outer attaching tab preform part secured to the blade preform part is greater than the thickness of each of the two inner or outer platform preform half-parts secured to the blade preform part.

8. The vane as claimed in claim 7, wherein warp yarns present in the inner or outer attaching tab part of the fiber reinforcement are diverted into the two inner or outer platform preform half-parts.

* * * * *